H. G. CORDLEY.
DEVICE FOR DISPENSING LIQUIDS.
APPLICATION FILED FEB. 7, 1917.
1,260,335.
Patented Mar. 26, 1918.
3 SHEETS—SHEET 1.
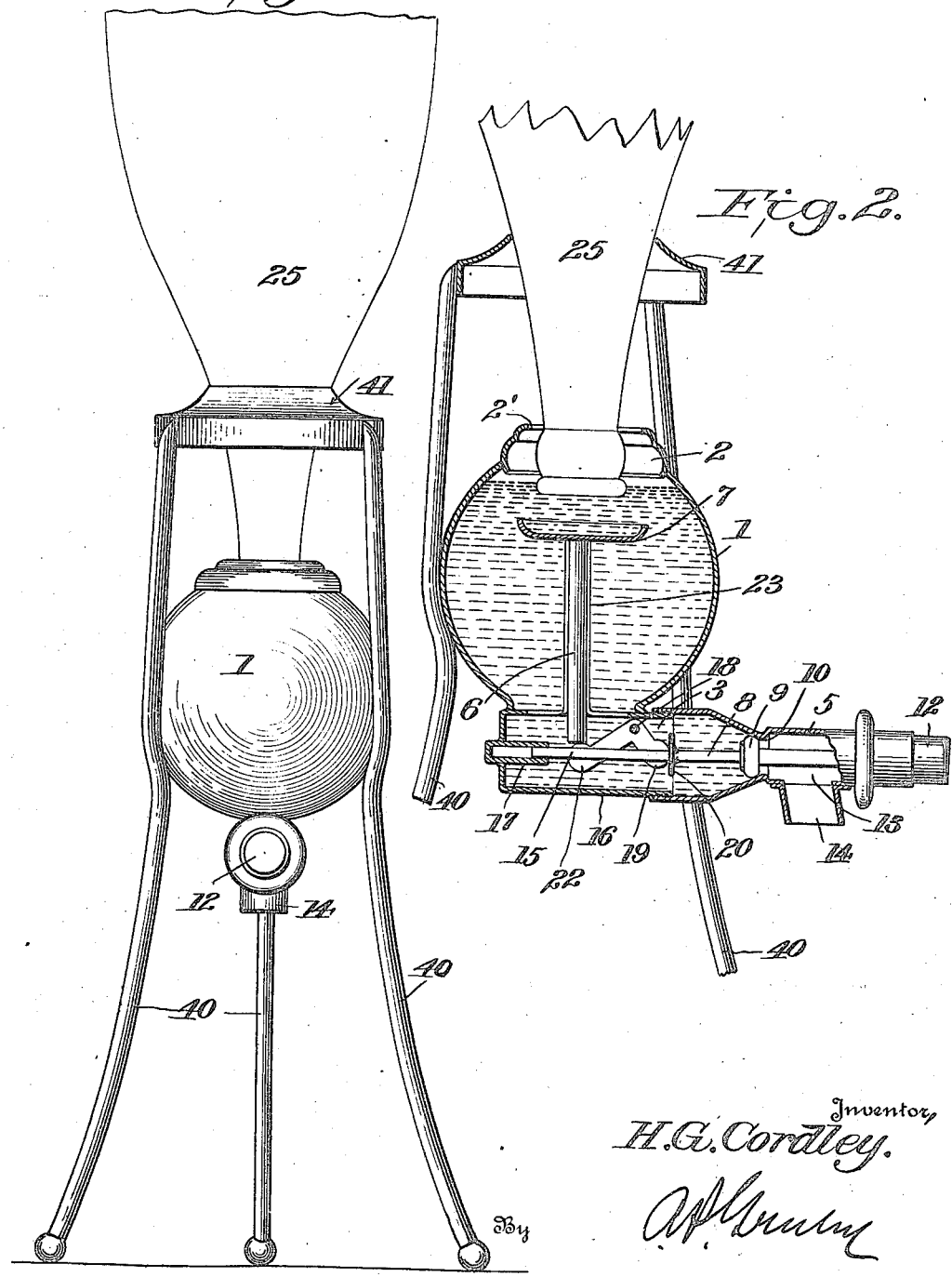
Inventor,
H. G. Cordley.
Attorney H. G. CORDLEY.
DEVICE FOR DISPENSING LIQUIDS.
APPLICATION FILED FEB. 7, 1917.
1,260,335.
Patented Mar. 26, 1918.
3 SHEETS—SHEET 2.
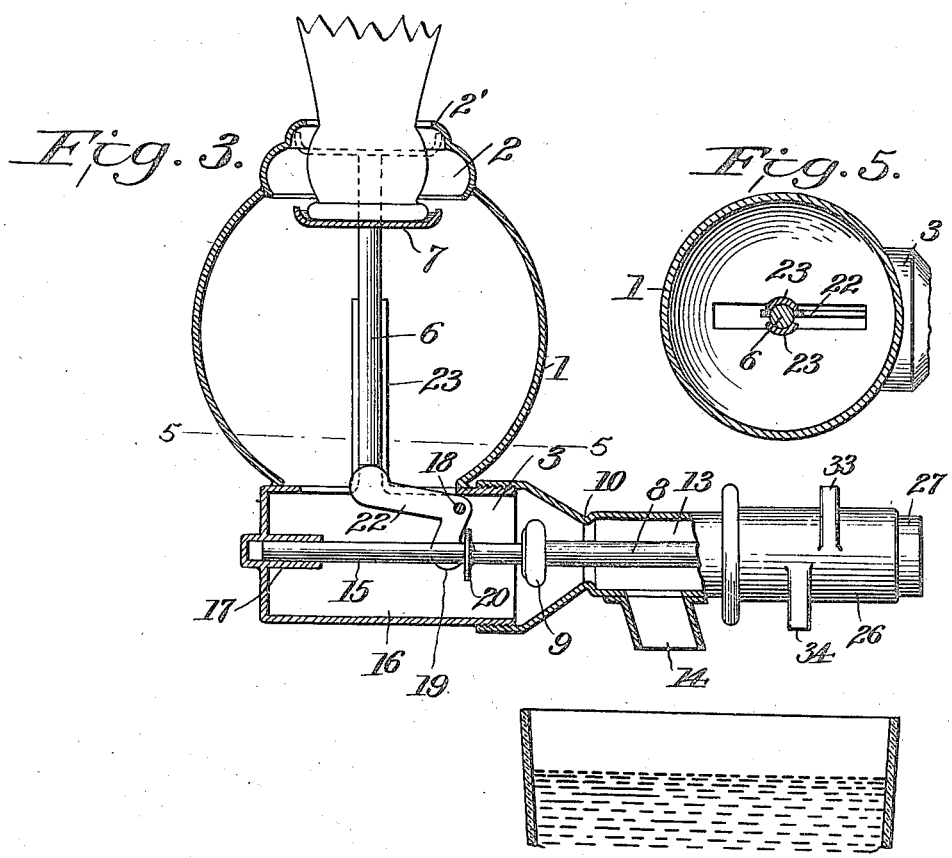
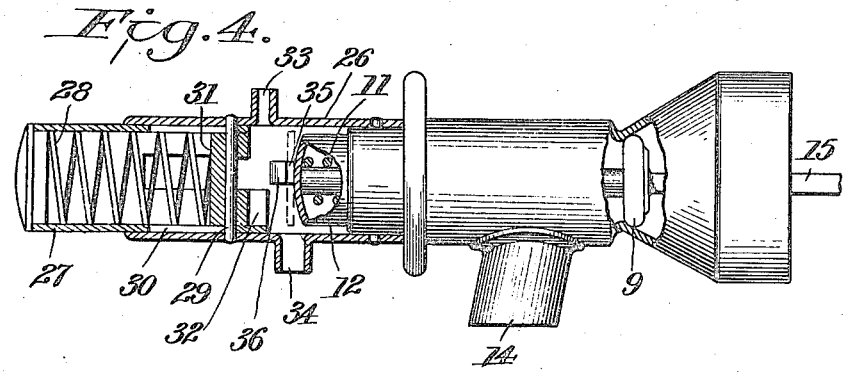
Inventor,
H. G. Cordley.
By
Attorney

UNITED STATES PATENT OFFICE.

HENRY G. CORDLEY, OF GLEN RIDGE, NEW JERSEY.

DEVICE FOR DISPENSING LIQUIDS.

1,260,335.  Specification of Letters Patent.  Patented Mar. 26, 1918.

Application filed February 7, 1917. Serial No. 147,108.

*To all whom it may concern:*

Be it known that I, HENRY G. CORDLEY, a citizen of the United States, residing at Glen Ridge, in the county of Essex, State of New Jersey, have invented certain new and useful Improvements in Devices for Dispensing Liquids, of which the following is a description, reference being had to the accompanying drawings, forming a part hereof.

My invention relates to liquid dispensing devices and has for its object to provide a simple, inexpensive device for dispensing liquid from a container such as an inverted bottle, by which a measured quantity, or not more than a measured quantity may be delivered upon a single actuation of the device, and which will be adapted to be secured to the bottle or other container before it is inverted.

A further object of the invention is to provide a dispensing device adapted to be actuated only on the insertion of a coin.

With these and other objects hereinafter explained in view, my invention consists in the construction and combination of elements hereinafter explained and particularly pointed out in the claims.

Referring to the drawings.

Figure 1 is a front view of a dispensing device embodying my invention.

Fig. 2 is a central vertical sectional view on an enlarged scale of the operating parts of the device shown in Fig. 1.

Fig. 3 is a view similar to Fig. 2 but showing a coin controlled mechanism applied to the faucet.

Fig. 4 is an enlarged detail view partly in section of the coin controlled mechanism.

Fig. 5 is a horizontal sectional view on line 5—5 of Fig. 3 and

Figure 6:
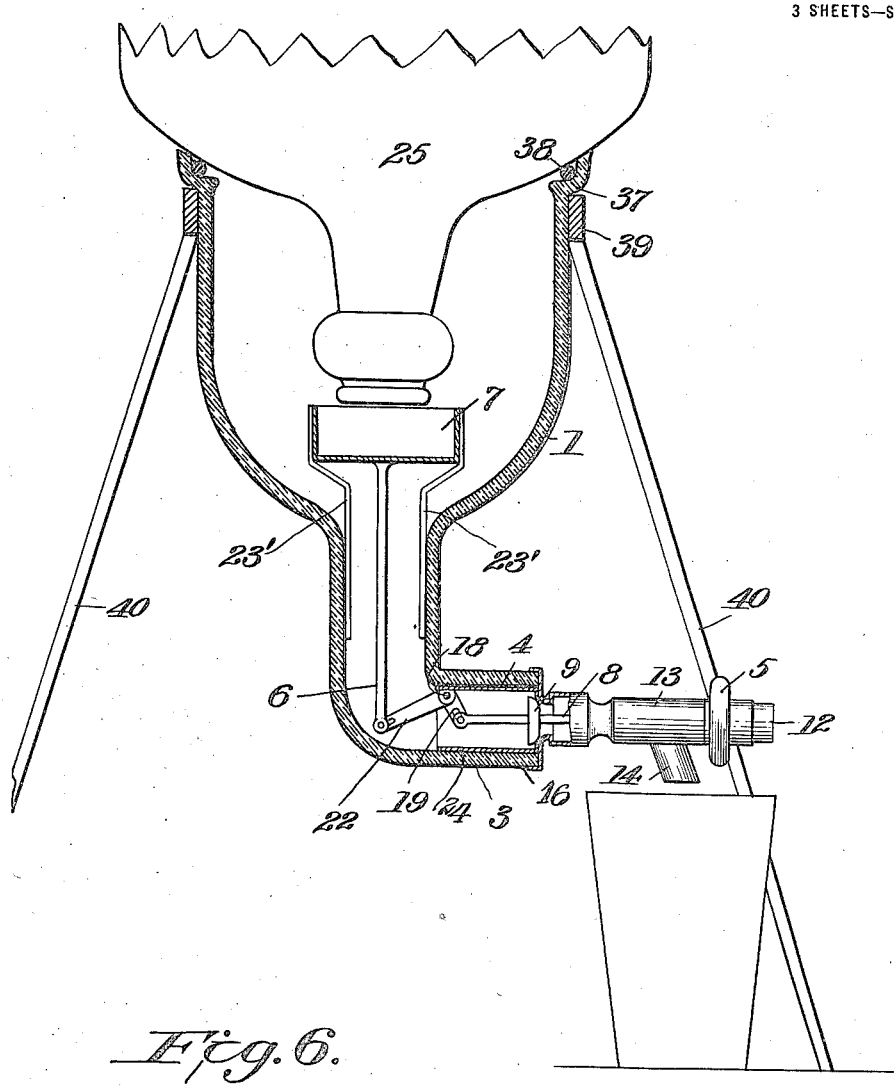
Fig. 6 is a view similar to Fig. 2 but showing a modified form.

In the drawings 1 indicates a measuring chamber shown in Figs. 1 to 3 as of metal but which, if preferred, may be of glass or porcelain as shown in Fig. 6. This measuring chamber is provided at its upper end with an opening 2 of sufficient size to admit the neck of the bottle or other container from which liquid is to be dispensed and is provided at its lower end with an opening 3 adapted to receive a faucet 5 for controlling the discharge.

Arranged within the measuring chamber and preferably in line with its vertical axis is a rod 6 carrying at its upper end a cup 7 of a diameter slightly greater than the outside diameter of the neck of the bottle with which the device is to be used so as to be capable, when in raised position, as shown in Fig. 3, of inclosing the mouth of the bottle and serving as a sealing cup.

The faucet 5 is preferably of the type known as the push faucet in which a longitudinal rod 8 carries within the faucet casing a valve 9 adapted to seat on the inner side of valve seat 10 against which the valve is normally held by push spring 11 (see Fig. 4) carried in push member 12. By pushing against push member 12 the valve 9 is moved away from its seat permitting liquid to enter the central chamber 13 of the valve casing from which it flows out through discharge spout 14.

The rod 8 is provided in rear of the valve 9 with an extension 15 for operating the rod 6, this portion 15 of the rod extending into a horizontal tubular portion 16 secured to or carried by the measuring chamber and forming part of it. In the construction shown in Figs. 1 to 3 inclusive this horizontal portion 16 is provided at its rear end opposite the opening with which the faucet is connecting, with a socket 17 which receives and guides the end of the extension 15. Pivoted within the horizontal portion 16 on a pin 18 is a bell crank lever having the end of its depending arm 19 in the path of a disk 20 carried by the extension 15, and having the end of its horizontal arm 22 in line with a portion of the lower end of the rod 6, the bell crank lever being arranged slightly to one side of the extension 15 and the rod 6 being of sufficient diameter at its lower end to be struck and operated by the end of the arm 22.

The rod 6, in the construction shown in Figs. 1 to 3 inclusive is guided in its vertical reciprocation by guide arms 23 extending upward within the measuring chamber and bent to inclose the rod.

In the construction shown in Fig. 6 the faucet is provided with a tubular portion 24 extending rearward into the horizontal portion 16 which in this construction is formed in one piece with the measuring chamber and carries the pivot pin 18 for the bell crank lever and the vertical rod 6 is guided by guide arms depending from the cup 7 and acting against the walls of the lower constricted portion of the measuring chamber.

When the device is in position on the neck of an inverted bottle the rod 6 will be in the position in which it is shown in Fig. 2, the valve 9 of the push faucet being, of course, in closed position. The parts being in the position shown, liquid from the inverted bottle will flow into the measuring chamber 1 until it fills it to the level of the mouth of the bottle when the flow will cease as no air can then get into the bottle.

On pushing the push member 12 inward the valve 9 will be moved away from its seat permitting the liquid to flow out and at the same time the disk 20 will be caused to act against the arm 19 of the bell crank lever and cause its arm 22 to raise the rod 6 and lift the sealing cup 7 up into the position in which it is shown in Fig. 3 to inclose the mouth of the bottle and being filled with liquid, to close it against the entrance of air and thus stop further flow.

The amount of liquid which will flow out will be not more than the amount in the measuring chamber when the push member 12 is pushed in however long the push member is held in its pushed position. Of course, if the push member is released before the measuring chamber is emptied the quantity dispensed will be less than the contents of the measuring chamber. As soon as the push member is released the rod 6 is permitted to drop by its own weight aided by the weight of the liquid in the cup 7, and the measuring chamber is at once refilled from the inverted bottle up to the level of the mouth of the bottle.

The measuring chamber 1 is supported by legs 40. In the construction shown in Figs. 1 to 3 inclusive these legs are secured to the measuring chamber and extend above it carrying on their upper ends a ring 41 having an opening through it for the neck of the bottle and adapted to serve to steady the bottle and hold it in proper vertical position. In the construction shown in Fig. 6 the legs 40 are secured at their upper ends to a ring 39 on which rests shoulder 37 of a flange formed on the upper end of the measuring chamber which as here shown has its upper end open for its full diameter so as to receive the neck of the bottle 25 here shown as a large bottle the shoulder of which rests on a ring 38 of rubber or other resilient material carried by the flange 37.

The push member may be arranged to act directly on the longitudinal rod 8 or as shown in Figs. 3 and 4 may be arranged to operate the rod 8 through the medium of a coin. In the construction shown for this purpose a tube 26 is secured to and extends forward from the faucet having in its outer end a push member 27 pressed outward by spring 28, the movement of this push member being limited by pin 29 and slots 30. On its inner end push member 27 carries a head 31 having on its lower side a rearwardly extending ledge 32. In the upper side of tube 26 near the position of the head 31 when in normal position is a coin slot 33 and in the lower side of the tube nearly in line with the end of the push member 12 of the faucet when it is in normal position is a coin discharge slot 34. In the sides of the tube 26 are springs 35 having heads 36 extending inward adapted to yield to permit a coin to be pushed past them and to engage the coin to disengage it from the ledge 32 so that it will drop through slot 34 when the push member 37 is released, the construction shown being similar to that shown in United States Patent No. 941,760 issued to me November 30, 1909.

The opening 2 in the construction shown in Figs. 1, 2, and 3 is provided with an inturned flange $2^1$ the inner diameter of which is slightly less than that of the sealing cup 7 so that when the device is inverted to place it on a bottle the cup will drop into contact with this flange and thus close the opening 2 against escape of any liquid which may remain in the measuring chamber.

It will, of course, be understood that I do not desire to be limited to the particular construction shown or described as it is obvious that many changes in details of construction can be made without departing from the spirit of my invention.

Having thus described my invention what I claim is:

1. A dispenser for inverted bottles comprising a chamber having an opening at its upper end adapted to receive the neck of the bottle and a discharge opening at its lower end, a vertically movable sealing cup within the chamber adapted to inclose the mouth of the bottle but normally out of position to seal the mouth of the bottle, an inwardly opening spring pressed valve closing the discharge opening and operating means between the spring pressed valve and the sealing cup so arranged that the opening movement of the valve causes the sealing cup to be lifted into position to seal the bottle mouth.

2. A dispenser for inverted bottles comprising a chamber having an opening at its upper end adapted to receive the neck of the bottle and a discharge opening at its lower end, a vertically movable sealing cup within the chamber adapted to inclose the mouth of the bottle but normally out of position to seal the mouth of the bottle, a faucet for the discharge opening having an inwardly opening spring pressed valve and operating means between the spring pressed valve and the sealing cup so arranged that the opening movement of the valve causes the sealing cup to be lifted into position to seal the bottle mouth.

3. A dispenser for inverted bottles comprising a chamber having an opening at its upper end adapted to receive the neck of the bottle and a discharge opening at its lower end, a vertically movable sealing cup within the chamber adapted to inclose the mouth of the bottle but normally out of position to seal the mouth of the bottle, a coin controlled faucet for the discharge opening having an inwardly opening spring pressed valve, and operating means between the spring pressed valve and the sealing cup so arranged that the opening movement of the valve causes the sealing cup to be lifted into position to seal the bottle mouth.

4. A dispenser for inverted bottles comprising a chamber having an opening at its upper end adapted to receive the neck of the bottle and a discharge opening at its lower end, a vertically movable sealing cup within the chamber adapted to inclose the mouth of the bottle but normally out of position to seal the mouth of the bottle, a coin controlled faucet for the discharge opening having an inwardly opening valve, and operating means between the spring pressed valve and the sealing cup so arranged that the opening movement of the valve causes the sealing cup to be lifted into position to seal the bottle mouth.

5. A dispenser for inverted bottles comprising a chamber having an opening at its upper end adapted to receive the mouth of the bottle and a discharge opening at its lower end, a vertically movable sealing means within the chamber adapted to seal the mouth of the bottle but normally out of sealing position, an inwardly opening spring pressed valve closing the discharge opening, and operating means between the spring pressed valve and the sealing means at the bottle mouth so arranged that the opening movement of the spring pressed valve causes the sealing means at the mouth of the bottle to seal the mouth of the bottle.

6. A dispenser for inverted bottles comprising a chamber having an opening at its upper end adapted to receive the mouth of the bottle and a discharge opening at its lower end, a vertically movable rod within the chamber provided at its upper end with a sealing cup adapted to seal the mouth of the bottle, an inwardly opening spring-pressed valve closing the discharge opening, a rod for operating the valve provided with a projection a bell crank lever pivoted within the chamber having one arm in the path of said projection and the other arm in line with the lower end of the vertically movable rod.

7. A dispenser for inverted bottles comprising a chamber having an opening at its upper end adapted to receive the mouth of the bottle and a discharge opening at its lower end, a vertically movable rod within the chamber provided at its upper end with a sealing cup adapted to seal the mouth of the bottle, and inwardly opening spring-pressed valve closing the discharge opening, a rod for operating the valve provided with a projection a bell crank lever pivoted within the chamber having one arm in the path of said projection and the other arm in line with the lower end of the vertically movable rod and means for guiding the valve operating rod.

8. A dispenser for inverted bottles comprising a chamber having an opening at its upper end adapted to receive the neck of the bottle and a discharge opening at its lower end, the opening at its upper end having an inturned flange, a vertically movable sealing cup within the chamber having a diameter greater than the opening in the upper end of the chamber, a valve controlling the discharge opening, and means for simultaneously opening the valve and raising the sealing cup.

In testimony whereof I affix my signature this fifth day of February, 1917.

HENRY G. CORDLEY.